United States Patent
Newbury

(10) Patent No.: US 10,031,298 B2
(45) Date of Patent: Jul. 24, 2018

(54) EXTENDED ACCESS OPTICAL FIBER CONNECTOR FERRULE

(71) Applicant: Senko Advanced Components, Inc., Marlborough, MA (US)

(72) Inventor: Paul Newbury, Ashland, MA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 15/286,792

(22) Filed: Oct. 6, 2016

(65) Prior Publication Data

US 2017/0097473 A1 Apr. 6, 2017

Related U.S. Application Data

(60) Provisional application No. 62/237,675, filed on Oct. 6, 2015.

(51) Int. Cl.
  *G02B 6/38* (2006.01)
  *G02B 6/40* (2006.01)

(52) U.S. Cl.
  CPC ......... *G02B 6/3885* (2013.01); *G02B 6/3861* (2013.01); *G02B 6/3882* (2013.01); *G02B 6/3887* (2013.01); *G02B 6/3893* (2013.01); *G02B 6/403* (2013.01)

(58) Field of Classification Search
  None
  See application file for complete search history.

(56) References Cited

U.S. PATENT DOCUMENTS

| | | | | |
|---|---|---|---|---|
| 6,761,489 | B1* | 7/2004 | Dean, Jr. | G02B 6/3833 385/60 |
| 8,529,138 | B2* | 9/2013 | Duis | G02B 6/3885 385/137 |
| 2002/0146215 | A1 | 2/2002 | Ogawa | |
| 2005/0036742 | A1* | 2/2005 | Dean, Jr. | G02B 6/3885 385/71 |
| 2006/0115217 | A1* | 6/2006 | Childers | G02B 6/3839 385/53 |
| 2006/0204178 | A1 | 9/2006 | Theuerkorn | |
| 2009/0257718 | A1 | 10/2009 | Nishimura | |

* cited by examiner

*Primary Examiner* — Tina Wong
(74) *Attorney, Agent, or Firm* — Edward S. Jarmolowicz, Esq.

(57) ABSTRACT

A fiber optic ferrule comprising a ferrule body having a plurality of optical fiber insertion holes at a first end thereof, the plurality of optical fiber insertion holes being configured to receive a plurality of optical fibers, and an extended access opening arranged at a top surface of a second end of the ferrule body located opposite the first end, the extended access opening being configured to provide open access to substantially an entirety of an interior space within the ferrule body.

9 Claims, 3 Drawing Sheets

EXTENDED ACCESS OPTICAL FIBER CONNECTOR FERRULE

CROSS-REFERENCE TO RELATED APPLICATIONS

This application claims the benefit of U.S. Provisional Application No. 62/237,675, filed Oct. 6, 2015.

BACKGROUND

Fiber optics have become the standard cabling medium used to meet the growing needs of data volume and transmission speeds of modern communication networks. Although fiber optic cabling is capable of providing the necessary high bandwidth data communication, proper installation of fiber optic components requires substantial costs and resources. Termination of the optical fibers is an important step in the installation process. However, using conventional technology, installation remains a time consuming, meticulous process that is prone to error. Individual optical fibers are typically extremely small. For example, even with protective coatings, optical fibers may only be about 250 microns in diameter. Nonetheless, the ends of the optical fibers must line up and form a continuous fiber optic connection. In addition, manipulation of a connector during installation and/or maintenance may stress the optical fibers, and possibly result in breakage of a fiber or fibers. Accordingly, fiber optic systems would benefit from technology capable of reducing inefficiencies and errors in fiber optic cable installations.

SUMMARY

According to one aspect, there is provided a fiber optic ferrule comprising a ferrule body having a plurality of optical fiber insertion holes at a first end thereof, the plurality of optical fiber insertion holes being configured to receive a plurality of optical fibers, and an extended access opening arranged at a top surface of a second end of the ferrule body located opposite the first end, the extended access opening being configured to provide open access to substantially an entirety of an interior space within the ferrule body.

In some embodiments, the fiber optic ferrule may be an MT ferrule. In some embodiments, the extended access opening may be configured to allow the plurality of optical fibers to be placed down into the interior space of the ferrule body.

In some embodiments, a flange may be located around a portion of the second end, the flange comprising two projections, each of the two projections protruding into the extended access opening to engage a fiber optic cable boot inserted into the interior space of the ferrule body.

According to another embodiment, there is provided a fiber optic ferrule comprising a ferrule body defining an interior space therein and having a plurality of optical fiber insertion holes configured to receive a plurality of optical fibers, and an extended access opening arranged at least at a top surface of the ferrule body, the extended access opening being configured to provide open access to a substantial portion of the interior space.

In some embodiments, said extended access opening may be configured to facilitate the alignment of the plurality of optical fibers into the plurality of optical fiber insertion holes. In some embodiments, said extended access opening may be further configured to receive an adhesive. In some embodiments, the extended access opening may be further configured to receive the plurality of optical fibers to the interior space through the top surface of the ferrule body.

The present disclosure is not limited to the particular embodiments described in this application, which are intended as illustrations of various aspects. Many modifications and variations can be made without departing from its spirit and scope, as will be apparent to those skilled in the art.

DETAILED DESCRIPTION

The described technology generally relates to data transmission elements, including fiber optic connectors and connector components. In some embodiments, the fiber optic connector components may include a fiber optic ferrule configured to connect with a corresponding fiber optic adapter. In some embodiments, a fiber optic ferrule may be configured to provide increased access to the internal components thereof to, for instance, increase the efficiency of, reduce the time required to, and/or otherwise facilitate the termination of fiber optic connectors. In some embodiments, the data transmission elements may include ferrules configured for various connection components, including, without limitation, mechanical transfer (MT), multiple-fiber push-on/pull-off (MPO), and multi-fiber MTP® connectors ("MTP"). In general, ferrules configured according to some embodiments may be formed to operate in accordance with JIS C 5981, IEC 61754-5, IEC-61754-7, "Fibre optic interconnecting devices and passive components—Fibre optic connector interfaces—Part 7: Type MPO connector family," and TIA-604-5-D "Fiber Optic Connector Intermateability Standard, Type MPO."

A male MT ferrule may generally include at least two guide pins for high-accuracy positioning of each optical fiber in the ferrule. A female MT ferrule body may include two guide pin holes on an end surface of the ferrule for receiving the guide pins therein, and may have a plurality of optical fiber holes for receiving optical fibers. The optical fibers may be inserted into the optical fiber insertion holes from a rear end of the MT ferrule, for example, a female MT ferrule, and may be fixed in place with adhesive, such as an epoxy.

An adapter may be used for face-to face joining of two MT ferrules. For instance, two MT ferrules, one with guide pins installed (male connector) and one without guide pins (female connector) may be inserted into opposite ends of an adapter such that the two ferrules may be aligned as the male guide pins enter the female guide pin holes. A non-limiting example of a connector that uses MT ferrules is an MPO connector.

The MT ferrules may be pushed together within an adapter to optically connect the ferrules (forming a "physical contact" (PC) connection), wherein the optical fibers in one ferrule contact the optical fibers in the other ferrule and get compressed together to provide an optical connection. Optical transmission performance between the optical fibers is strongly dependent on connecting conditions such as axis alignment and inclination of the optical fibers, and gaps between the opposing optical fibers.

Figures 1A, 1B:
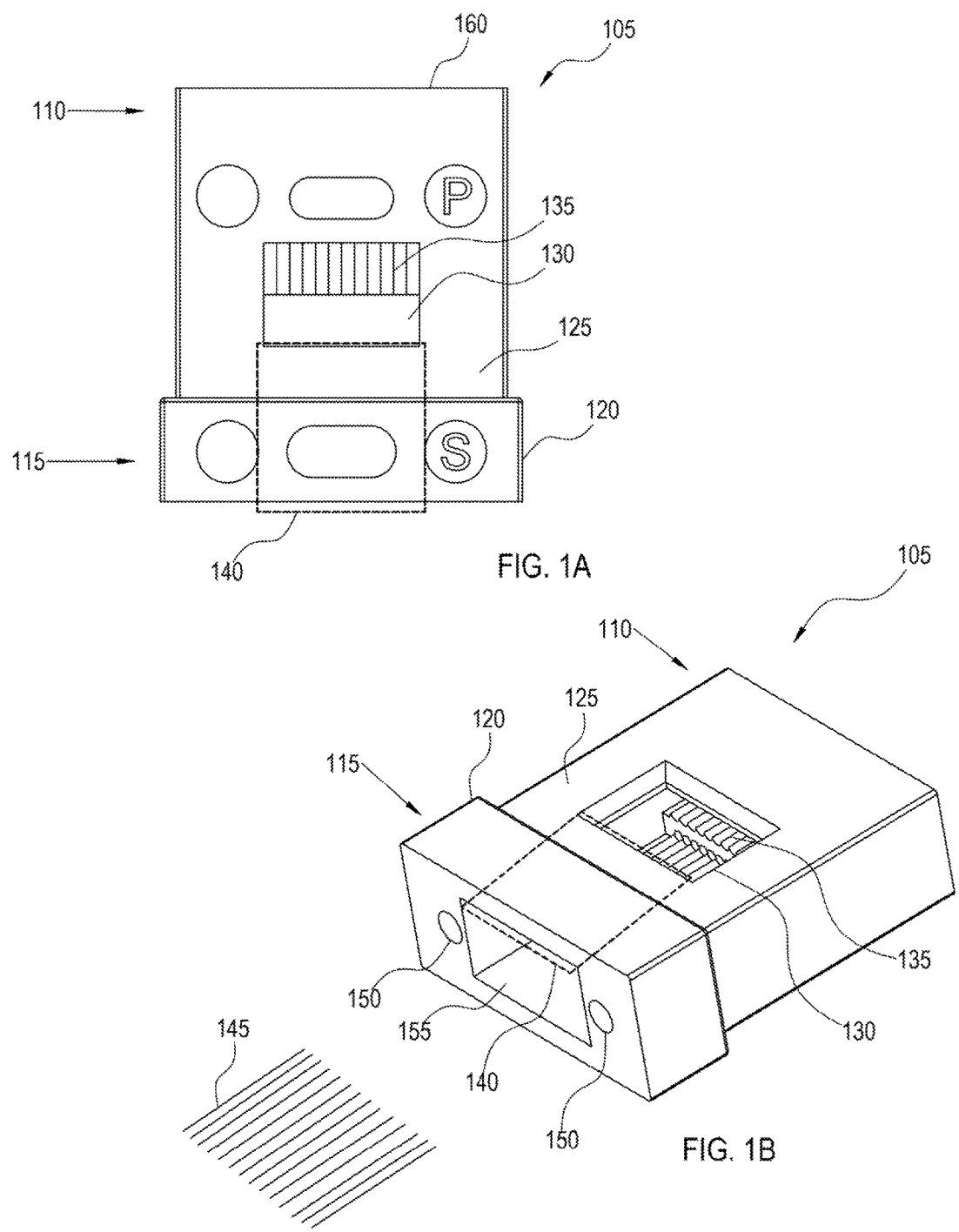
FIGS. 1A and 1B depict a fiber optic ferrule.

FIGS. 1A and 1B depict a fiber optic ferrule. As shown in FIGS. 1A and 1B, a ferrule 105 may include a ferrule body 160 having a first end 110 and a second end 115. The first end 110 may be configured to be inserted into corresponding adapter (not shown), such as an MPO adapter. The second end 115 may be configured to engage a fiber optic connector housing (not shown).

The second end 115 may include an opening 155 configured for receiving an end of a multi-fiber optical cable 145. In some embodiments, the multi-fiber optical cable 145 may be a ribbon cable of a plurality of individual optical fibers. The first end 110 may include a connection end face having a plurality of optical fiber insertion holes 135 arranged in one or more rows. Individual optical fibers of the multi-fiber cable 145 may be arranged in the holes 135 to terminate at the connection end face.

The second end 115 may include a flange 120 having guide pin holes 150 (or guide pins on a male ferrule) arranged therein. The optical fibers of the multi-fiber optical cable 145 may be inserted through the cable opening 155 and into the optical fiber insertion holes 135. A top surface 125 of the ferrule 105 may include an access opening 130 that allows an installer to see the optical fibers of the multi-fiber optical cable 145 as they are being inserted into the ferrule and into the optical fiber insertion holes 135. The access opening 130 may provide some assistance to the installer for guiding the optical fibers into the insertion holes 135. The optical fibers may be fixed in place by use of an adhesive that may be injected into the interior of the ferrule 105, for example, through the access opening 130 and/or the cable opening 155.

Although the ferrule 105 includes an access opening 130 for visualizing the internal volume of the ferrule, in some circumstances it may still be challenging for an installer to accurately and efficiently insert the optical fibers and make a secure connection with the optical fiber insertion holes 135. More specifically, the access opening 130 may be of a generally small size and may provide only a very restricted view and access to the interior of the ferrule 105. In particular, adequate access to the interior of the ferrule 105 may be prevented because an installer may not be able to access the interior of the ferrule bounded by area 140 due to the material of the flange 120 and the top surface 125 that blocks such access. Accordingly, the benefit of the access opening 130 may be limited and, in particular, it may be difficult for an installer to be able to adequately locate the insertion holes 135 during the critical step of insertion of the optical fibers.

Figure 2A:
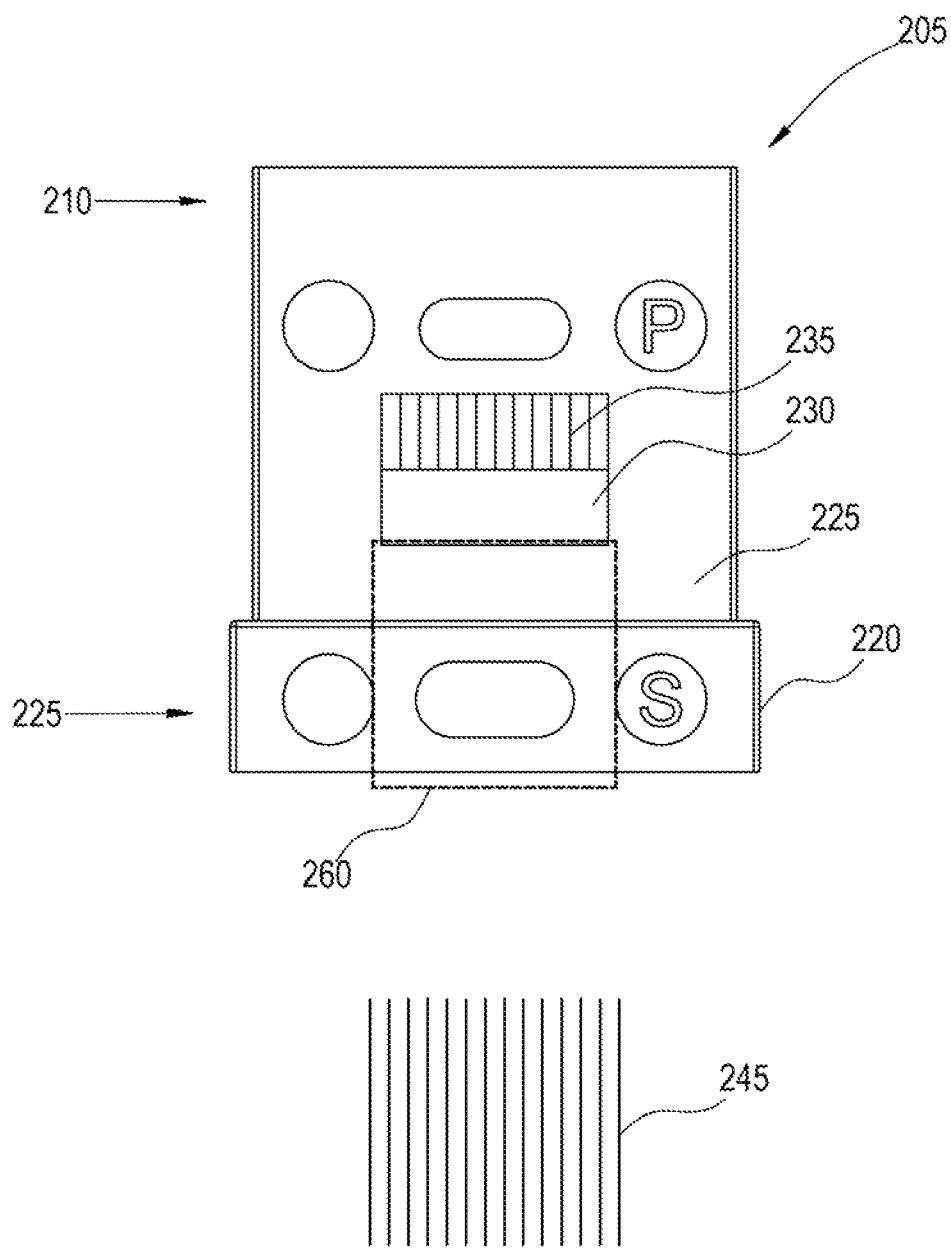
FIGS. 2A and 2B depict an extended access ferrule according to some embodiments.
Figure 2B:
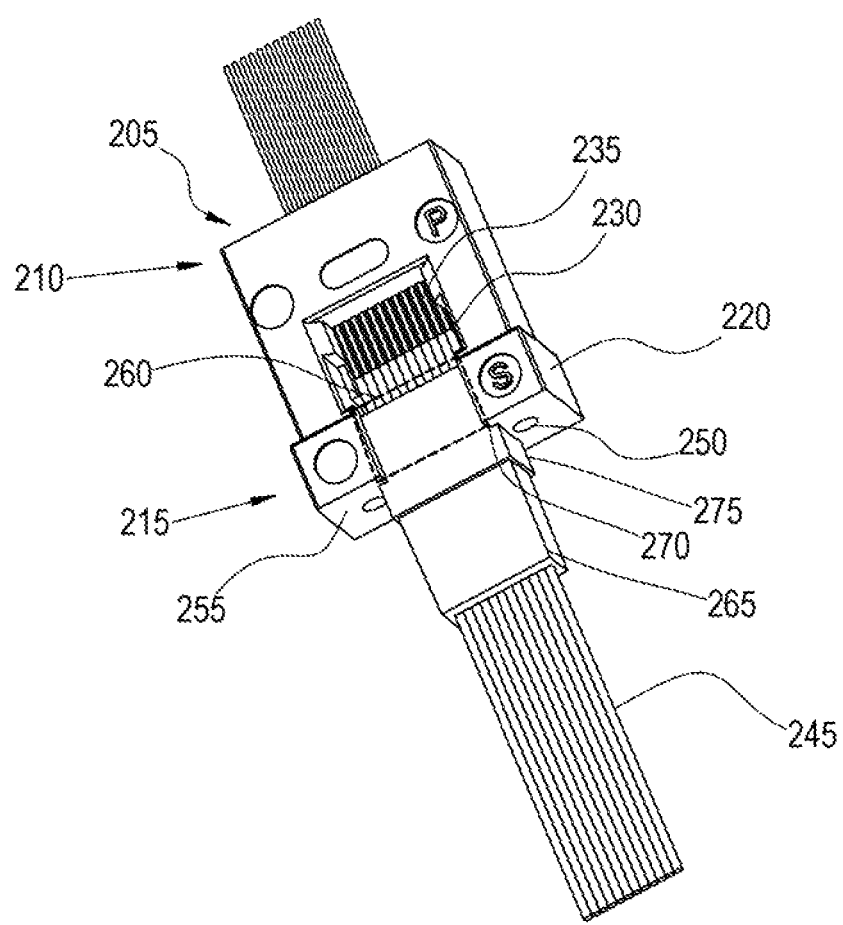

FIGS. 2A and 2B depict an extended access ferrule according to some embodiments. FIG. 2A depicts a top view of an extended access ferrule 205 having a first end 210 and a second end 215 having an opening 255 and a flange 220 disposed around a portion of the opening. The extended access ferrule 205 may include an extended access opening 230 arranged on a top surface 225 that provides access to an interior of the ferrule within area 260, which was not accessible in ferrule 105 (e.g., depicted as area 140 in FIGS. 1A and 1B). Accordingly, an installer has an increased area of accessibility to the interior of the extended access ferrule 205 to connect the multi-fiber optical cable 245 into the insertion holes 235. In contrast to conventional ferrules, the extended access opening 230 of the extended access ferrule 205 does not include a lid or cover and facilitates the alignment of the optical fibers of the multi-fiber optical cable 145 into the insertion holes 235.

In some embodiments, referring to FIG. 2B, a portion of the multi-fiber optical cable 245 may be arranged within a boot 265 (or other type of housing). The flange 220 may include projections 270 configured to engage a top portion 275 of the boot 265 to restrict or prevent movement of the housing away from and/or out of the interior of the extended access ferrule 205.

Using a conventional ferrule, an installer is required to insert the multi-fiber optical cable 145 through the opening 155 in a direction from the first end 110 to the second end 115. For instance, the multi-fiber optical cable 145 must be placed on grooves (e.g., v-grooves) in the interior of the ferrule 105 and pushed at the correct angle to move the multi-fiber optical cable 145 into contact with the insertion holes 135. This process is inefficient and error prone.

In some embodiments, an installer using an extended access ferrule 205 may place the multi-fiber optical cable 145 into the interior of the extended access ferrule through a top of the extended access via the extended access opening 230 ferrule (i.e., the access opening as extended through area 260) because the installer has access to area, thereby facilitating more efficient and accurate optical fiber installation in the insertion holes 235. For example, an installer may place pre-cleaved optical fibers down onto the grooves (e.g., v-grooves) within the extended access ferrule 205 and then the installer may slide the boot 265 into place within the extended access ferrule 205. The optical fibers may be fixed in place on portions of and/or within the extended access ferrule 205 through the use of an adhesive.

Accordingly, an installer using an extended access ferrule 205 may terminate optical fiber connections (such as MPO connections using an extended access MT ferrule) faster and more accurately than the installer would be capable of terminating using conventional ferrules. This leads to decreased costs and reduced time requirements for terminating fiber optic connections in a network using extended access ferrules 205.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A fiber optic ferrule comprising:
a ferrule body having a plurality of optical fiber insertion holes at a first end thereof, the plurality of optical fiber insertion holes being configured to receive a plurality of optical fibers;
an extended access opening arranged at a top surface of a second end of the ferrule body located opposite the first end, the extended access opening being configured to provide open access to substantially an entirety of an interior space within the ferrule body; and
a flange located around a portion of the second end, the flange comprising two projections, each of the two projections protruding into the extended access opening to engage a fiber optic cable boot inserted into the interior space of the ferrule body.

2. The fiber optic ferrule of claim 1, wherein the fiber optic ferrule is an MT ferrule.

3. The fiber optic ferrule of claim 1, wherein the extended access opening is configured to allow the plurality of optical fibers to be placed down into the interior space of the ferrule body.

4. The fiber optical ferrule of claim 1, wherein the ferrule body has a bottom wall underlying the access opening, the projections protruding over the bottom wall.

5. A fiber optic ferrule comprising:
a ferrule body defining an interior space therein and having a plurality of optical fiber insertion holes configured to receive a plurality of optical fibers
an extended access opening arranged at least at a top surface of the ferrule body, the extended access opening being configured to provide open access to a substantial portion of the interior space; and
a flange comprising two projections, each of the two projections protruding into the extended access opening to engage a fiber optic cable boot inserted into the interior space of the ferrule body.

6. The fiber optic ferrule of claim 5, wherein said extended access opening is configured to facilitate the alignment of the plurality of optical fibers into the plurality of optical fiber insertion holes.

7. The fiber optic ferrule of claim 6, wherein said extended access opening is further configured to receive an adhesive.

8. The fiber optic ferrule of claim 5, wherein said extended access opening is further configured to receive the plurality of optical fibers to the interior space through the top surface of the ferrule body.

9. The fiber optic ferrule of claim 5 wherein the ferrule body has a bottom wall underlying the access opening, the projections protruding over the bottom wall.

* * * * *